(12) United States Patent
Simacek et al.

(10) Patent No.: US 11,586,358 B2
(45) Date of Patent: Feb. 21, 2023

(54) BUILDING FILE SYSTEM IMAGES USING CACHED LOGICAL VOLUME SNAPSHOTS

(71) Applicant: Red Hat, Inc., Raleigh, NC (US)

(72) Inventors: Michael Simacek, Brno (CZ); Miroslav Suchy, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 530 days.

(21) Appl. No.: 14/573,137

(22) Filed: Dec. 17, 2014

(65) Prior Publication Data

US 2016/0179409 A1 Jun. 23, 2016

(51) Int. Cl.
*G06F 3/06* (2006.01)
(52) U.S. Cl.
CPC ............ *G06F 3/0619* (2013.01); *G06F 3/065* (2013.01); *G06F 3/067* (2013.01); *G06F 3/0665* (2013.01)
(58) Field of Classification Search
None
See application file for complete search history.

(56) References Cited

U.S. PATENT DOCUMENTS

| | | | |
|---|---|---|---|
| 5,950,010 A * | 9/1999 | Hesse ...................... | G06F 8/61 709/220 |
| 6,457,170 B1 | 9/2002 | Boehm et al. | |
| 7,356,679 B1 * | 4/2008 | Le ...................... | G06F 9/45558 713/1 |
| 7,539,976 B1 | 5/2009 | Ousterhoust et al. | |
| 8,209,680 B1 * | 6/2012 | Le ...................... | G06F 9/45558 717/174 |
| 8,307,351 B2 | 11/2012 | Weigert | |
| 8,327,330 B1 | 12/2012 | Yang et al. | |
| 8,396,838 B2 | 3/2013 | Brockway et al. | |
| 8,418,164 B2 * | 4/2013 | Schneider ................. | G06F 8/63 717/168 |
| 8,468,518 B2 * | 6/2013 | Wipfel ...................... | G06F 8/61 717/168 |
| 9,038,085 B2 * | 5/2015 | Assuncao ............... | G06F 9/455 709/201 |
| 2003/0018759 A1 * | 1/2003 | Baumann .................. | G06F 8/63 709/221 |
| 2009/0313115 A1 * | 12/2009 | Konig .................... | G06Q 30/02 705/14.45 |
| 2010/0087173 A1 * | 4/2010 | Lin ....................... | H04L 12/586 455/412.2 |
| 2010/0153920 A1 | 6/2010 | Bonnet | |
| 2011/0270841 A1 * | 11/2011 | Bhardwaj .......... | G06Q 30/0631 707/741 |

(Continued)

OTHER PUBLICATIONS

Handy, Jim. The Cache Memory Book. 2nd Edition. San Diego, CA, USA. Academic Press, Inc. 1998. p. 57-60.*

(Continued)

*Primary Examiner* — Edward J Dudek, Jr.
*Assistant Examiner* — Ralph A Verderamo, III
(74) *Attorney, Agent, or Firm* — Lowenstein Sandler LLP

(57) ABSTRACT

Systems and methods for building file system images using cached logical volume snapshots. An example method may comprise: producing a buildroot descriptor in view of a list of identifiers of software packages to be included into a new file system image; and responsive to locating, in a storage memory, a logical volume snapshot associated with the buildroot descriptor, creating the new file system image using the logical volume snapshot.

20 Claims, 4 Drawing Sheets

(56) References Cited

U.S. PATENT DOCUMENTS

| | | | | |
|---|---|---|---|---|
| 2012/0240110 | A1* | 9/2012 | Breitgand | G06F 9/45558 718/1 |
| 2012/0297181 | A1* | 11/2012 | Lee | G06F 8/68 713/2 |
| 2013/0073865 | A1* | 3/2013 | Kornafeld | H04L 9/3231 713/189 |
| 2013/0198745 | A1* | 8/2013 | De | G06F 9/45533 718/1 |
| 2013/0212709 | A1* | 8/2013 | Tucker | G06F 21/55 726/29 |
| 2013/0339470 | A1* | 12/2013 | Jeswani | H04L 67/1097 709/213 |
| 2014/0082613 | A1* | 3/2014 | Kundu | G06F 8/63 718/1 |
| 2015/0120669 | A1* | 4/2015 | Ibanescu | G06F 8/61 707/649 |
| 2015/0172107 | A1* | 6/2015 | Brant | G06F 8/61 709/216 |
| 2015/0331707 | A1* | 11/2015 | Hellkvist | G06F 8/63 718/1 |

OTHER PUBLICATIONS

"Fedora and LVM", LWN.net, Oct. 31, 2013, 3 pages ttp://lwn.net/Articles/522264/.

"Space-Efficient Reproducible Builds Using Schroot, Sbuild and LVM", pseudorandom.co.uk, 2007, 6 pages http://www.pseudorandom.co.uk/2007/sbuild/.

"Set up Sbuild to Use LVM and Schroot", killyourtv.i2p.rocks, Oct. 29, 2014, 6 pages http://killyourtv.i2p.rocks/howtos/sbuild+lvm+schroot/.

"Caching Buildroot RPMS in Koku1.7+", LiveJournal.com, Oct. 17, 2013, 1 page http://sharkcz.livejournal.com/11677.html.

"Using Mock to Test Package Builds", fedoraproject.org,,2014, 4 pages http://fedoraproject.org/wiki/Using_Mock_to_test_package_builds.

* cited by examiner

BUILDING FILE SYSTEM IMAGES USING CACHED LOGICAL VOLUME SNAPSHOTS

TECHNICAL FIELD

The present disclosure is generally related to computer system, and is more specifically related to systems and methods for building file system images.

BACKGROUND

Various file system image building systems, ranging from shell scripts running on a single host to orchestration services running within cloud computing environments, produce file system images comprising certain software applications installed on top of an operating system (OS). A software package comprising one or more software modules may require certain dependencies (other software packages) to be installed on top of a certain OS.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
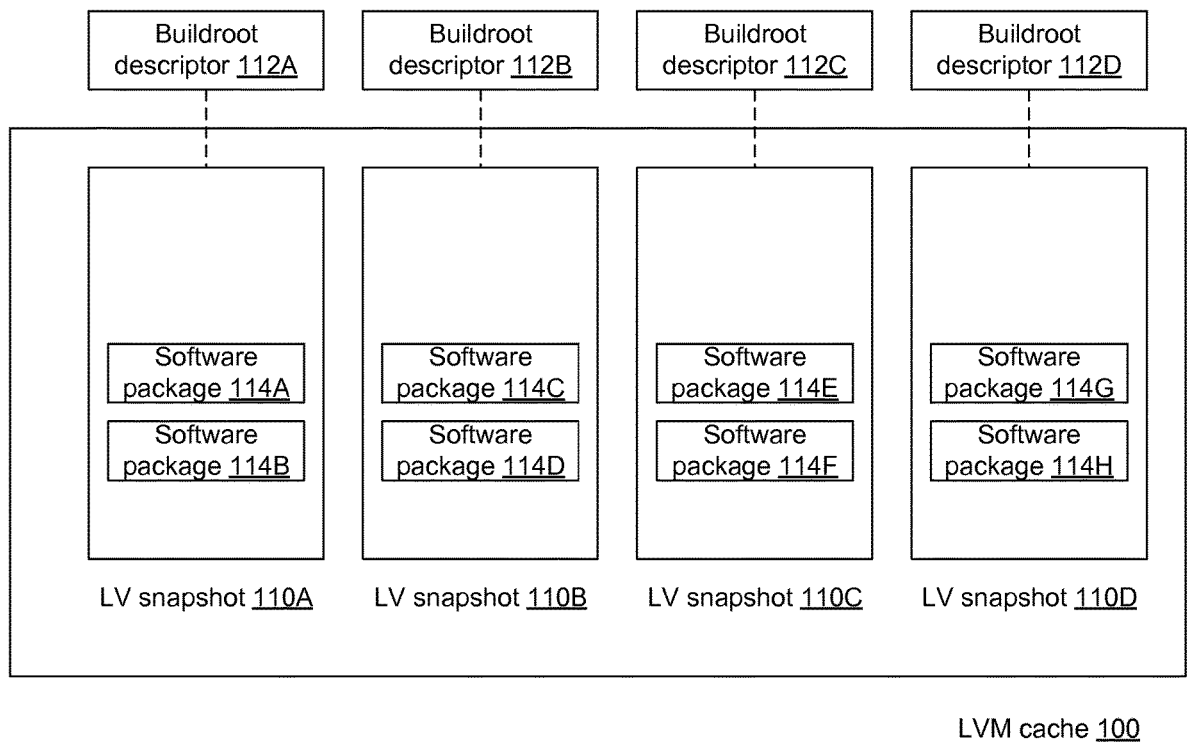
FIG. 1 schematically depicts a high-level component diagram of a logical volume manager (LVM) cache, in accordance with one or more aspects of the present disclosure.

Described herein are methods and systems for building file system images using cached logical volume snapshots.

Various file system image build systems, ranging from shell scripts running on a single host to orchestration services running within cloud computing environments, produce file system images comprising certain software applications installed on top of an operating system (OS). A software package comprising one or more software modules may require certain dependencies (other software packages) to be installed on top of a certain OS.

Software dependencies may be multi-level, e.g., a software package P1 may depend on a software package P2, which in turn may depend on software packages P3 and P4. Two or more software packages may share a considerable number of dependencies. Thus, efficient management of the dependencies may improve the overall efficiency of the software provisioning process.

In accordance with one or more aspects of the present disclosure, certain pre-built file system images comprising various sets of software packages installed on top of the corresponding operating systems may be stored as logical volume snapshots for a future re-use. Each snapshot may be identified by a buildroot descriptor represented by a value of a pre-defined function of the identifiers of the software packages comprised by the snapshot. In certain implementations, the buildroot descriptor may be produced by lexicographically ordering the list of identifiers of the software packages, and then calculating a pre-defined hash function of concatenated elements of the ordered list. The lexicographical ordering of the list makes the identifier insensitive to the initial order of the identifiers of the software package in the list.

In certain implementations, the snapshots may be cached (e.g., in the logical volume manager (LVM) cache) for faster retrieval. In an illustrative example, a processing device implementing the methods described herein may receive a new file system image request comprising a list of identifiers of software packages to be included into the file system image. The requestor may be represented by a user or by a functional module (e.g., an orchestration module of a cloud computing system).

Responsive to receiving the request, the processing device may process the list of identifiers of software packages to produce a corresponding buildroot descriptor, and attempt to locate the logical volume snapshot associated with the buildroot descriptor in a pre-defined storage memory (e.g., in the LVM cache). Responsive to successfully locating the logical volume snapshot, the processing device may use it for creating the requested file system image, as described in more details herein below.

Responsive to failing to locate, in the LVM cache, a logical volume snapshot associated with the specified buildroot descriptor, the processing device may create a new logical volume comprising a file system image with the software packages identified by the specified list. The processing device may use a snapshot of the newly created logical volume for creating the requested file system image, as described in more details herein below. The processing device may further store the snapshot of the newly created logical volume in the cache for later re-use. The least recently used snapshot may be removed from the cache responsive to determining that there is not enough space in the cache for creating a new snapshot.

Various aspects of the above referenced methods and systems are described in details herein below by way of examples, rather than by way of limitation.

In certain implementations, file system images may reside on logical volumes that are managed by a logical volume manager (LVM). Logical volume management facilitates storage virtualization by providing a layer of abstraction over the physical storage, including methods of allocating space on mass-storage devices for creation and handling of logical volumes. Logical volume management may be implemented by one or more software modules, such as device drivers of an operating system, and/or by one or more functional modules of a cloud computing system.

Various LVM implementations support physical volumes, which can be provided by hard disks, hard disk partitions, or Logical Unit Numbers (LUNs) of mass-storage device. An LVM may treat each physical volume as comprising a sequence of physical extents that may be mapped to logical extents. The LVM may pool a plurality of logical extents into a logical volume. Applications may use the logical volumes as raw block devices similar to disk partitions, by creating mountable file systems on the logical volumes, or using the logical volumes as swap storage.

An LVM may implement logical volume snapshots by applying copy-on-write (COW) to each logical extent. In this scheme, the volume manager may copy the logical extent to a COW table just before overwriting the logical extent, thus preserving the current version of the logical volume as the snapshot, which may be later reconstructed by applying the copy-on-write table to the current logical volume.

Systems and methods of the present disclosure may be implemented using various logical volume managers, including, e.g., Linux® LVM, IBM® AIX® Logical Volume Manager, HP® UX LVM, FreeBSD® Vinum Volume Manager, NetBSD® Logical Volume Manager, SunOS® Solaris® Volume Manager, etc.

FIG. 1 schematically depicts a high-level component diagram of an LVM cache, in accordance with one or more aspects of the present disclosure. LVM cache 100 may comprise a plurality of logical volume snapshots 110A-110K residing in a dedicated storage memory 120. Each logical volume snapshot may be associated with a corresponding buildroot descriptor 112A-112K derived from the list of identifiers of software packages 114 that are installed on the logical volume.

In accordance with one or more aspects of the present disclosure, LVM cache 100 may be configured to support look up and retrieval of logical volume snapshots 110 by their associated buildroot descriptors 112. In an illustrative example, the computer system implementing the systems and methods disclosed herein may maintain a memory data structure comprising a plurality of mappings of buildroot descriptors to the locations of the corresponding logical volume snapshots in the LVM cache.

In accordance with one or more aspects of the present disclosure, LVM cache 100 may be associated with a list of logical volume snapshot identifiers that is reverse-chronologically ordered by the snapshot access time, so that the identifier of the most recently accessed snapshot would be at the first position of the list, and the identifier of the least recently accessed snapshot would be at the last position the list. In an illustrative example, the computer system implementing the systems and methods disclosed herein may move a snapshot identifier to the first position of the list each time when the corresponding snapshot is accessed. The computer system may be configured to remove, from LVM cache 100, the least recently accessed logical volume snapshot responsive to determining that there is not enough space in the cache for creating a new snapshot.

As noted herein above, each logical volume snapshot may be associated with a buildroot descriptor that is derived from the list of identifiers of software packages that are comprised by the corresponding logical volume. In an illustrative example, the computer system implementing the systems and methods disclosed herein may lexicographically order the list of identifiers of the software packages, concatenate the elements of the ordered list to produce a temporary string, and then calculate a pre-defined hash function of the temporary string. The lexicographical ordering of the list makes the identifier insensitive to the initial order of the identifiers of the software package in the list. In various illustrative examples, the hash function may be provided by a check sum of a pre-defined size, a SHA-1 hash function, or by any other suitable function that provides a reasonable distribution of the input variable values over the range of the function values.

Figure 2:
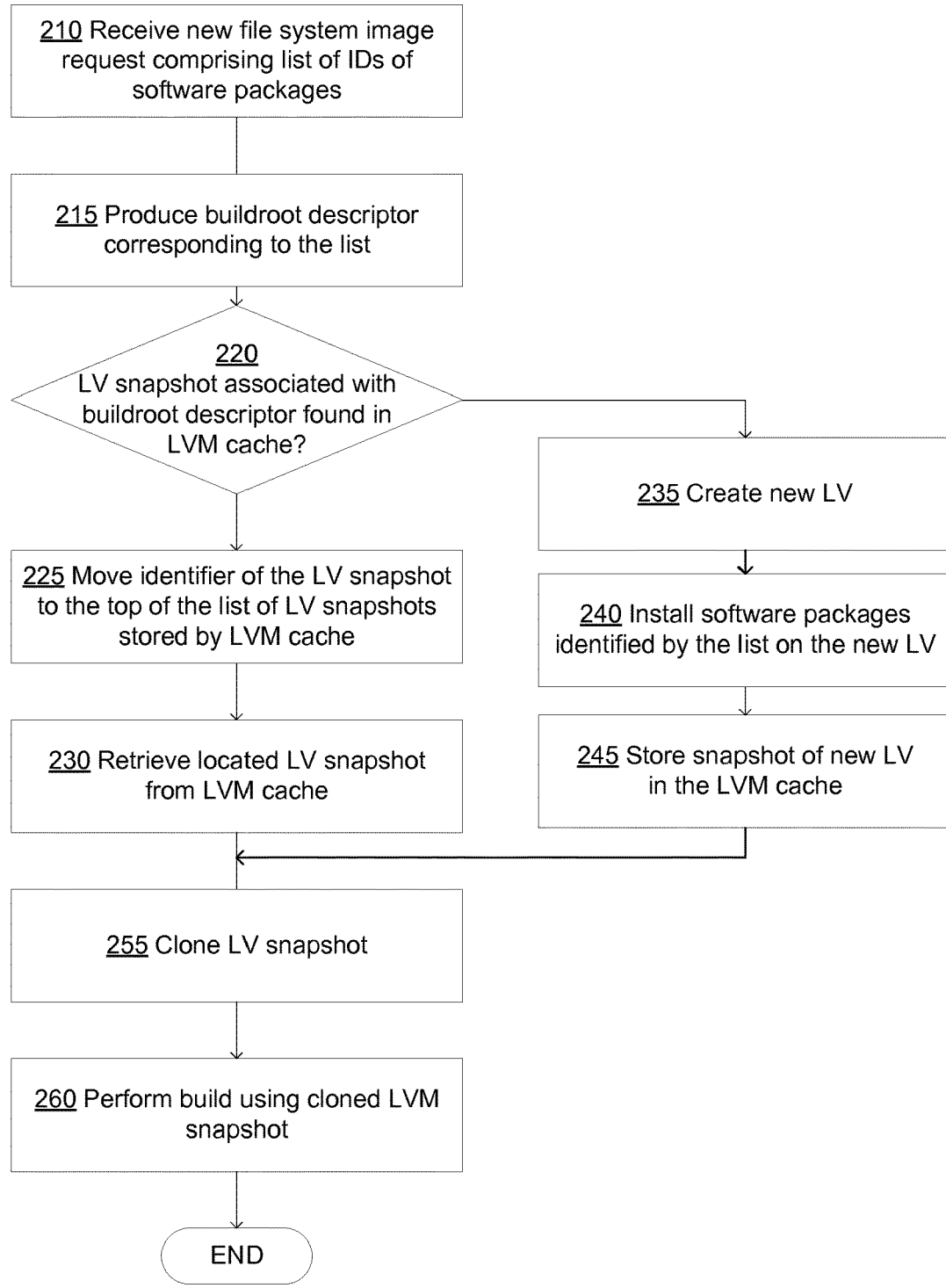
FIG. 2 depicts a flow diagram of an illustrative example of a method for building file system images using cached logical volume snapshots, in accordance with one or more aspects of the present disclosure.

FIG. 2 depicts a flow diagram of an example method 200 for building file system images using cached logical volume snapshots, in accordance with one or more aspects of the present disclosure. Method 200 and/or each of its individual functions, routines, subroutines, or operations may be performed by one or more processing devices of the computer system (e.g., example computer system 1000 of FIG. 4) executing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processing threads implementing method 200 may be executed asynchronously with respect to each other.

At block 210, the processing device implementing the method may receive a new file system image request comprising a list of identifiers of software packages to be included into the file system image.

Responsive to receiving the request, the processing device may, at block 215, process the list of identifiers of software packages to produce a corresponding buildroot descriptor. In an illustrative example, the processing device may lexicographically order the list of identifiers of the software packages, concatenate the elements of the ordered list to produce a temporary string, and then calculate a pre-defined hash function of the temporary string. In various illustrative examples, the hash function may be provided by a check sum of a pre-defined size, a SHA-1 hash function, or by any other suitable function, as described in more details herein above.

Responsive to ascertaining, at block 220, that the logical volume snapshot associated with the buildroot descriptor is found in a pre-defined storage memory (e.g., in the LVM cache), the processing may continue at block 225. Otherwise, the method may branch to block 235.

At block 225, the processing device may move an identifier of the located logical volume snapshot to the first position of a list of identifiers of the logical volume snapshots stored by the LVM cache.

At block 230, the processing device may retrieve the located logical volume snapshot from the LVM cache, and the processing may continue at block 255.

At block 235, responsive to failing to locate, in the LVM cache, a logical volume snapshot associated with the calculated buildroot descriptor, the processing device may create a new logical volume.

At block 240, the processing device may install, on the newly created logical volume, the operating system and software packages identified by the new file system image request.

At block 245, the processing device may store a snapshot of the newly created logical volume in the LVM cache. The least recently used snapshot may be removed from the cache responsive to determining that there is not enough space in the cache for creating a new snapshot, as described in more details herein above.

At block 250, the processing device may associate the calculated buildroot descriptor with the newly created logical volume snapshot. In an illustrative example, the processing device may maintain a memory data structure comprising a plurality of mappings of buildroot descriptors to the locations of the corresponding logical volume snapshots in the LVM cache, as described in more details herein above.

At block 255, the processing device may clone the retrieved or newly created logical volume snapshot. In certain implementations, cloning the logical volume snapshot may produce a new copy-on-write (COW) snapshot associated with the original logical volume snapshot.

At block 260, the processing device may create the new file system image using the cloned snapshot, by installing and configuring the necessary software components. In certain implementations, the cloned snapshot may be destroyed after the build process completes. Upon completing the operations referenced by block 260, the method may terminate.

Figure 3:
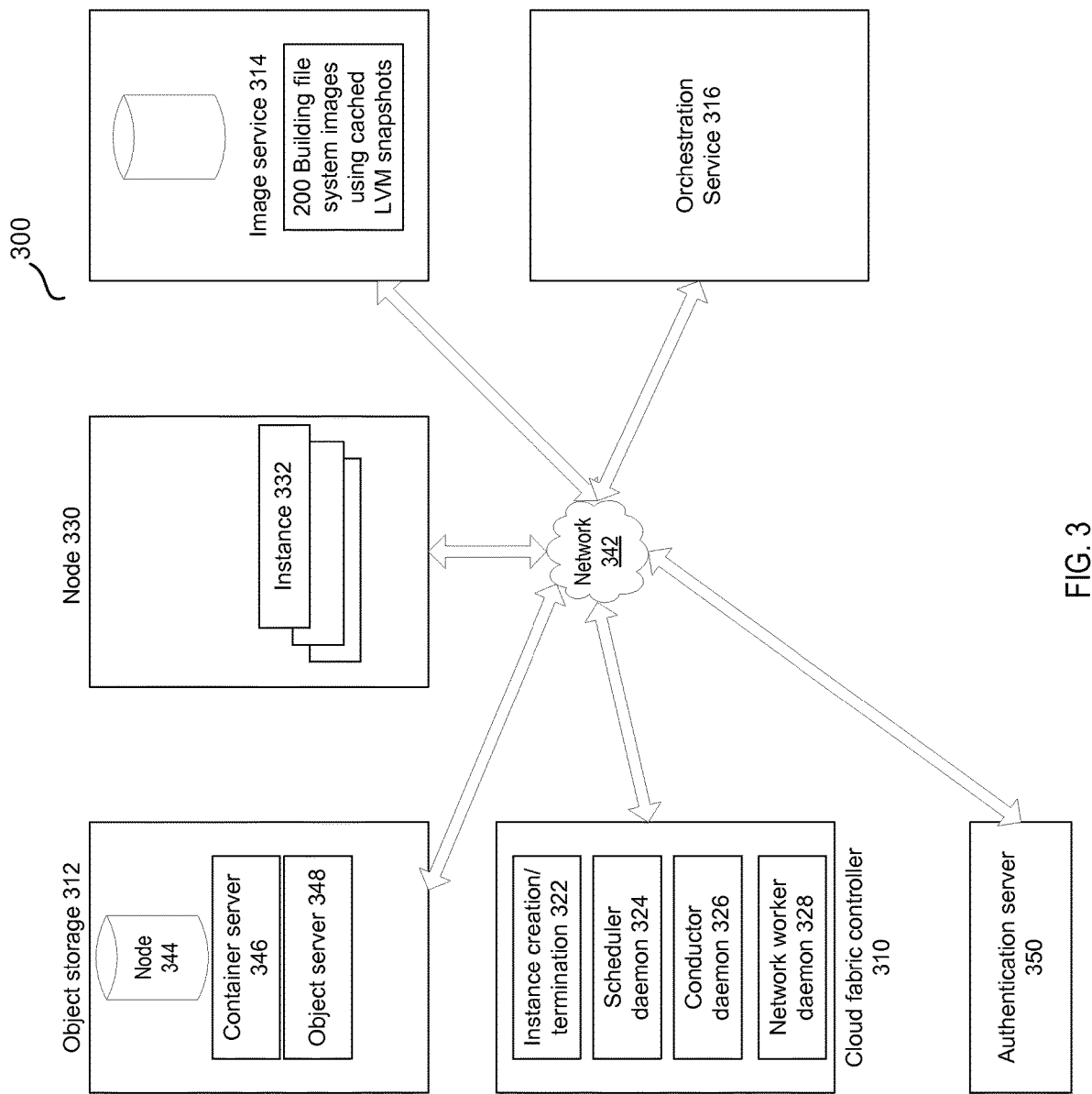
FIG. 3 schematically illustrates a cloud computing platform 300 configured to operate in accordance with one or more aspects of the present disclosure.

In certain implementations, the system and methods described herein may be implemented by a cloud computing platform. FIG. 3 schematically illustrates a cloud computing platform 300 configured to operate in accordance with one or more aspects of the present disclosure. In an illustrative example, cloud computing platform 300 may implement OpenStack platform. Cloud computing platform 300 may comprise a cloud fabric controller service 310, an object storage service 312, an image service 314, and an orchestration service 316. While FIG. 3 illustrates each of the above listed services running on a dedicated hardware server, in certain implementations, two or more of those services may be collocated on a single hardware server. Servers 300 executing the above listed services may be interconnected by one or more networks 342, including one or more local area networks, one or more wide area networks, or any combination thereof.

Cloud fabric controller service 310 may be employed for hosting and managing cloud computing systems. In the OpenStack platform, the cloud fabric controller functionality may be provided by Compute Service. The cloud fabric controller service may comprise several daemon processes, including a worker daemon 322 that creates and terminates virtual machine instances through hypervisor APIs, a scheduler daemon 324 that retrieves a virtual machine instance requests from a queue and assigns each request to a host computer, a conductor daemon 326 that manages interactions between worker daemon 322 and a cloud database, and a network worker daemon 328 that retrieves and performs networking tasks from a queue.

Object storage service 312 may provide a multi-tenant object storage system for large amounts of unstructured data. In certain implementations, object storage service 312 may implement a REST-compliant application programming interface (API). In an illustrative example, HTTP protocol may be used as the transport layer for the API. In an illustrative example, object storage service 312 may comprise one or more storage nodes 344, one or more container servers 346 to manage mappings of object containers, one or more object servers 348 to manage objects (such as files) on the storage nodes, and one or more authentication servers 350 to manage accounts defined within the object storage service.

Image service 314 may be employed to discover, register, and retrieve virtual machine images. The service includes a REST-compliant API that allows users to query virtual machine image metadata and retrieve images via HTTP requests. Virtual machine images made available through the image service may be stored in a variety of locations, including the object storage service, various file systems, HTTP access to remote Internet locations, and/or block devices. In certain implementations, image service 314 may be configured to implement method 200 for building file system images using cached logical volume snapshots.

Figure 4:
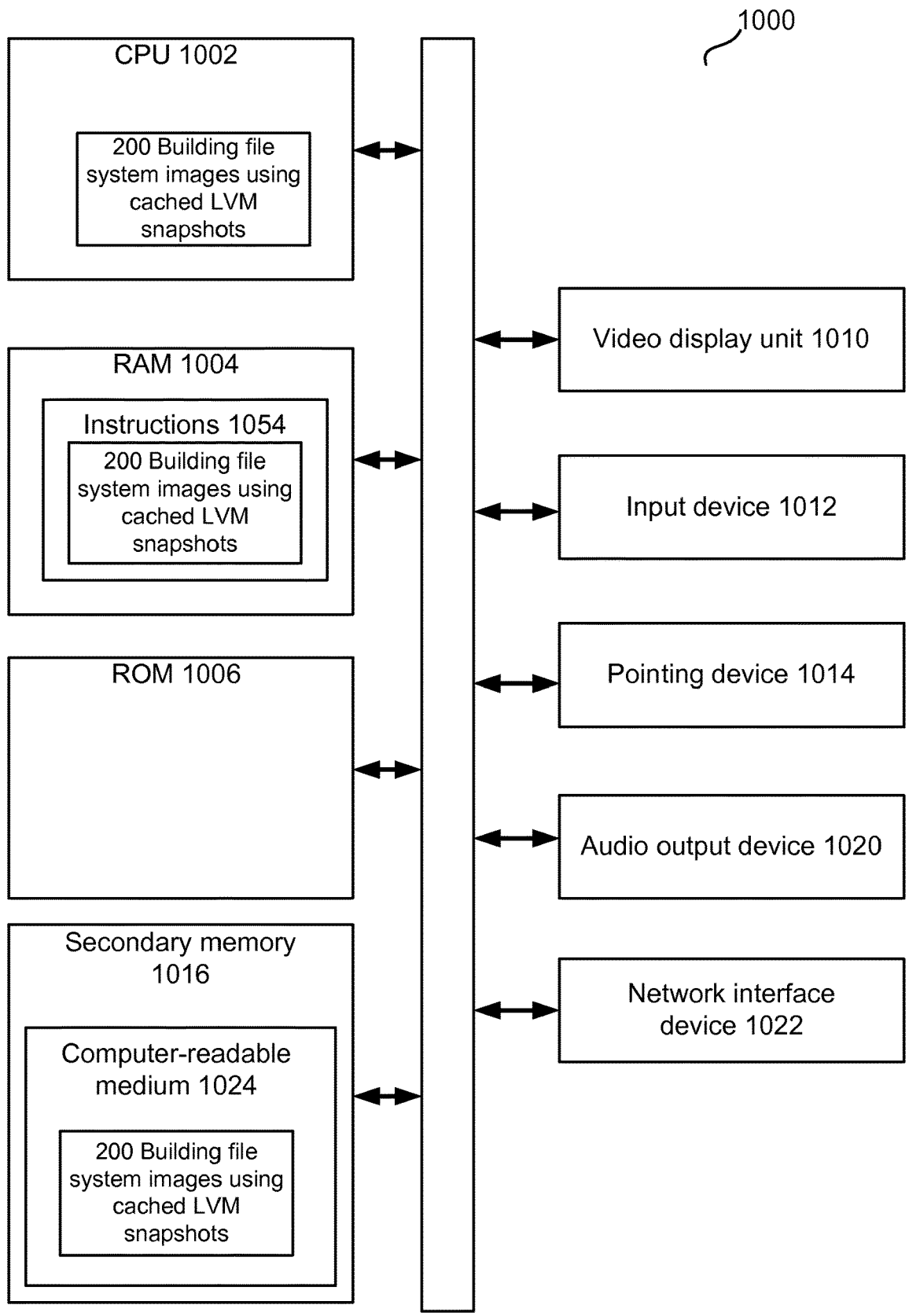
FIG. 4 depicts an illustrative computer system operating in accordance with one or more aspects of the present disclosure.

FIG. 4 schematically illustrates a component diagram of an example computer system 1000 which can perform any one or more of the methods described herein. Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute instructions encoding method 200 for building file system images using cached logical volume snapshots.

Example computer system 1000 may further comprise a network interface device 1008, which may communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding method 200 for building file system images using cached logical volume snapshots.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 6 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
    receiving a file system image request comprising a plurality of identifiers of software packages;
    producing, by a processing device, a file system image descriptor by applying a pre-defined function to a lexicographically-ordered list of the identifiers of software packages to be included into a new file system image;
    responsive to failing to locate, in a storage memory, a logical volume snapshot identified by the file system image descriptor, creating a new logical volume comprising a sequence of logical extents that are mapped to physical extents;
    installing the software packages on the new logical volume, wherein the software packages include a first software package depending on a second software package;
    producing a snapshot of the new logical volume while preserving a current version of the new logical volume;
    creating a new file system image by installing and configuring software components on the snapshot of the new logical volume; and
    storing, in the storage memory, the snapshot of the new logical volume comprising the new file system image.

2. The method of claim 1, wherein the storage memory comprises a logical volume manager (LVM) cache.

3. The method of claim 1, further comprising:
    removing, from the storage memory, a least recently accessed logical volume snapshot.

4. The method of claim 1, wherein the file system image descriptor is insensitive to an order of the identifiers of the software packages.

5. The method of claim 1, wherein the pre-defined function is provided by a checksum of a pre-defined size.

6. The method of claim 1, wherein the pre-defined function is provided by a function that provides a specified distribution of input variable values over a range of function values.

7. The method of claim 1, wherein locating the logical volume snapshot further comprises:
    looking up the file system image descriptor in a memory data structure comprising a plurality of mappings of file system image descriptors to locations of corresponding logical volume snapshots.

8. A system, comprising:
    a memory; and
    a processing device, operatively coupled to the memory, to:
        receive a file system image request comprising a plurality of identifiers of software packages;
        produce a file system image descriptor by applying a pre-defined function to a lexicographically-ordered list of the identifiers of software packages to be included into a new file system image;

responsive to failing to locate, in a storage memory, a logical volume snapshot identified by the file system image descriptor, create a new logical volume comprising a sequence of logical extents that are mapped to physical extents;

install the software packages on the new logical volume, wherein the software packages include a first software package depending on a second software package;

produce a snapshot of the new logical volume while preserving a current version of the new logical volume;

create a new file system image by installing and configuring software components on the snapshot of the new logical volume; and store, in the storage memory, the snapshot of the new logical volume comprising the new file system image.

9. The system of claim 8, wherein the storage memory comprises a logical volume manager (LVM) cache.

10. The system of claim 8, wherein the file system image descriptor is insensitive to an order of the identifiers of the software packages.

11. The system of claim 8, wherein the pre-defined function is provided by a checksum of a pre-defined size.

12. The system of claim 8, wherein the pre-defined function is provided by a function that provides a specified distribution of input variable values over a range of function values.

13. The system of claim 8, wherein locating the logical volume snapshot further comprises:

looking up the file system image descriptor in a memory data structure comprising a plurality of mappings of file system image descriptors to locations of corresponding logical volume snapshots.

14. The system of claim 8, wherein the processing device is further to:

remove, from the storage memory, a least recently accessed logical volume snapshot.

15. A non-transitory computer-readable storage medium comprising executable instructions that, when executed by a processing device of a file system server, cause the processing device to:

receive a file system image request comprising a plurality of identifiers of software packages;

produce, by the processing device, a file system image descriptor by applying a pre-defined function to a lexicographically-ordered list of the identifiers of software packages to be included into a new file system image;

responsive to failing to locate, in a storage memory, a logical volume snapshot identified by the file system image descriptor, create a new logical volume comprising a sequence of logical extents that are mapped to physical extents;

install the software packages on the new logical volume, wherein the software packages include a first software package depending on a second software package;

produce a snapshot of the new logical volume while preserving a current version of the new logical volume;

create a new file system image by installing and configuring software components on the snapshot of the new logical volume; and store, in the storage memory, the snapshot of the new logical volume comprising the new file system image.

16. The non-transitory computer-readable storage medium of claim 15, wherein the storage memory comprises a logical volume manager (LVM) cache.

17. The non-transitory computer-readable storage medium of claim 15, wherein the file system image descriptor is insensitive to an order of the identifiers of the software packages.

18. The non-transitory computer-readable storage medium of claim 15, wherein the pre-defined function is provided by a checksum of a pre-defined size.

19. The non-transitory computer-readable storage medium of claim 15, wherein the pre-defined function is provided by a function that provides a specified distribution of input variable values over a range of function values.

20. The non-transitory computer-readable storage medium of claim 15, wherein locating the logical volume snapshot further comprises:

looking up the file system image descriptor in a memory data structure comprising a plurality of mappings of file system image descriptors to locations of corresponding logical volume snapshots.

* * * * *